US012739054B2

(12) United States Patent
Huang

(10) Patent No.: US 12,739,054 B2
(45) Date of Patent: Sep. 15, 2026

(54) ACCESS POINT, STATION, AND WIRELESS COMMUNICATION METHOD

(71) Applicant: GUANGDONG OPPO MOBILE TELECOMMUNICATIONS CORP., LTD., Dongguan (CN)

(72) Inventor: Lei Huang, Singapore (SG)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 276 days.

(21) Appl. No.: 18/420,057

(22) Filed: Jan. 23, 2024

(65) Prior Publication Data

US 2024/0163008 A1 May 16, 2024

Related U.S. Application Data

(63) Continuation of application No. PCT/CN2022/112205, filed on Aug. 12, 2022.

(30) Foreign Application Priority Data

Aug. 13, 2021 (SG) ............................ 10202108883P

(51) Int. Cl.
*H04L 1/00* (2006.01)
*H04L 5/00* (2006.01)
*H04W 80/02* (2009.01)

(52) U.S. Cl.
CPC .......... *H04L 1/0027* (2013.01); *H04L 1/0003* (2013.01); *H04L 5/0044* (2013.01); *H04W 80/02* (2013.01)

(58) Field of Classification Search
CPC ... H04L 1/0027; H04L 1/0003; H04L 5/0044; H04W 80/02; H04W 84/12; H04W 74/006; H04W 88/08; H04W 80/06
See application file for complete search history.

(56) References Cited

U.S. PATENT DOCUMENTS

2019/0191451 A1* 6/2019 Patil ...................... H04W 74/08
2020/0052832 A1 2/2020 Tian
(Continued)

FOREIGN PATENT DOCUMENTS

CN 112753185 A 5/2021
CN 113016155 A 6/2021
EP 4277175 A1 11/2023

OTHER PUBLICATIONS

International Search Report in the international application No. PCT/CN2022/112205, mailed on Nov. 14, 2022. 3 pages.
(Continued)

*Primary Examiner* — Charles C Jiang
(74) *Attorney, Agent, or Firm* — BAYES PLLC

(57) ABSTRACT

An access point (AP), a station (STA), and a wireless communication method are provided. The method includes receiving, by a STA (e.g., an EHT STA), a physical layer protocol data unit (PPDU) which carries one or more trigger frames for performing a high efficiency (HE) trigger-based (TB) PPDU transmission or an extremely high efficiency (EHT) TB PPDU transmission of a TB aggregate PPDU (A-PPDU) transmission to an AP. In another embodiment, the method includes receiving, by an EHT STA, a PPDU which carries two or more aggregate medium access control (MAC) protocol data units (A-MPDUs) for performing any of one or more HE TB PPDU transmission and one or more EHT TB PPDU transmission of a TB A-PPDU transmission to an AP.

20 Claims, 17 Drawing Sheets

(56) References Cited

U.S. PATENT DOCUMENTS

| | | | | |
|---|---|---|---|---|
| 2020/0221292 | A1 | 7/2020 | Li | |
| 2020/0368455 | A1 | 11/2020 | Hua | |
| 2021/0227529 | A1 | 7/2021 | Chu | |
| 2021/0235319 | A1 | 7/2021 | Huang | |
| 2021/0399838 | A1 | 12/2021 | Lou | |
| 2022/0255681 | A1 * | 8/2022 | Huang | H04L 1/1685 |

OTHER PUBLICATIONS

Written Opinion of the International Search Authority in the international application No. PCT/CN2022/112205, mailed on Nov. 14, 2022. 5 pages.

Jason Yuchen Guo, Huawei, "IEEE P802.11 Wireless LANs, CR for EHT TRS", IEEE 802.11-21/0663r4, Apr. 13, 2021, the whole document. 11 pages.

"IEEE P802.11be™ M/D1.0, Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 8: Enhancements for extremely high throughput (EHT)", Prepared by the 802.11 Working Group of the LAN/MAN Standards Committee of the IEEE Computer Society, IEEE P802.11be/D1.0, May 2021, Section 9.3.1.22, Section 35.4.2. 635 pages.

Non-Final Office Action of the U.S. Appl. No. 19/233,812, issued on Aug. 13, 2025.

Supplementary European Search Report in the European application No. 22855538.9, mailed on Nov. 4, 2024. 11 pages.

"35. Extremely high throughput (EHT) MAC specification", IEEE Draft; TGBE_CL_35, IEEE-SA, Piscataway, NJ USA, vol. 802. 11be drafts, No., D1.1, Jul. 23, 2021 (Jul. 23, 2021), pp. 1-86, XP068183930, section 35.4.2.2.4.

"26. High-efficiency (HE) MAC specification (11ax) 26.1 Introduction", IEEE Draft; REVME_CL_26. FM, IEEE-SA, Piscataway, NJ USA No. D0.2, Aug. 5, 2021 (Aug. 5, 2021), pp. 1-183, XP068184083, section 26.5.2.2.4.

Supplementary European Search Report in the European application No. 25220261.9, mailed on Mar. 5, 2026.

* cited by examiner

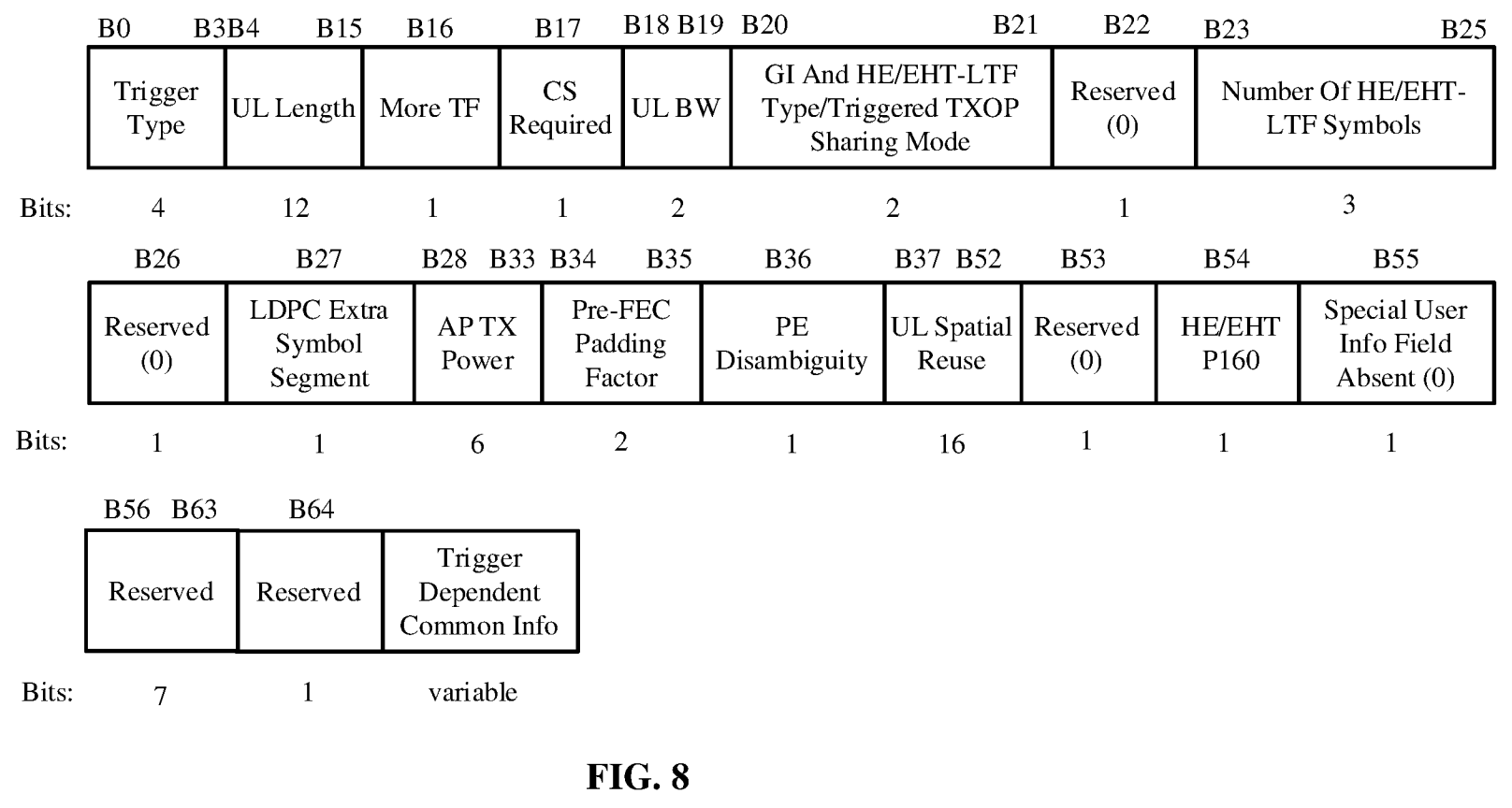

| | B0 B3 | B4 B15 | B16 | B17 | B18 B19 | B20 B21 | B22 | B23 B25 |
|---|---|---|---|---|---|---|---|---|
| | Trigger Type | UL Length | More TF | CS Required | UL BW | GI And HE/EHT-LTF Type/Triggered TXOP Sharing Mode | Reserved (0) | Number Of HE/EHT-LTF Symbols |
| Bits: | 4 | 12 | 1 | 1 | 2 | 2 | 1 | 3 |

| | B26 | B27 | B28 B33 | B34 B35 | B36 | B37 B52 | B53 | B54 | B55 |
|---|---|---|---|---|---|---|---|---|---|
| | Reserved (0) | LDPC Extra Symbol Segment | AP TX Power | Pre-FEC Padding Factor | PE Disambiguity | UL Spatial Reuse | Reserved (0) | HE/EHT P160 | Special User Info Field Absent (0) |
| Bits: | 1 | 1 | 6 | 2 | 1 | 16 | 1 | 1 | 1 |

| | B56 B63 | B64 | |
|---|---|---|---|
| | Reserved | Reserved | Trigger Dependent Common Info |
| Bits: | 7 | 1 | variable |

FIG. 8

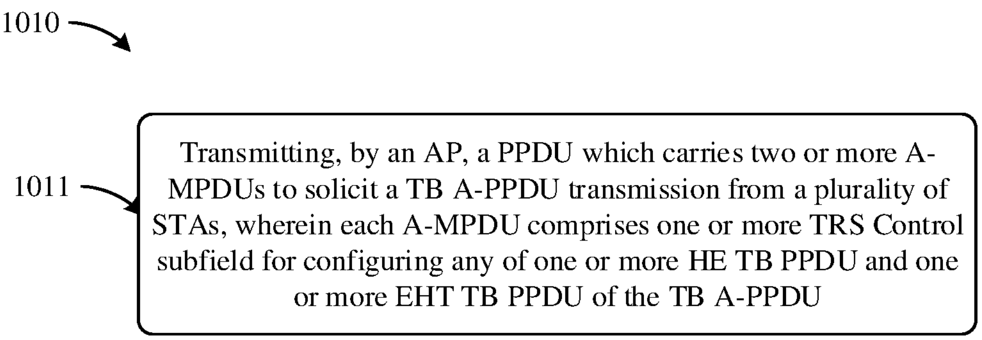
FIG. 10A
1020
1021
Receiving, by an EHT STA, a PPDU which carries two or more A-MPDUs for performing any of one or more HE TB PPDU transmission and one or more EHT TB PPDU transmission of a TB A-PPDU transmission to an AP, wherein each A-MPDU comprises one or more TRS Control subfield for configuring any of the one or more HE TB PPDU and the one or more EHT TB PPDU of the TB A-PPDU
FIG. 10B
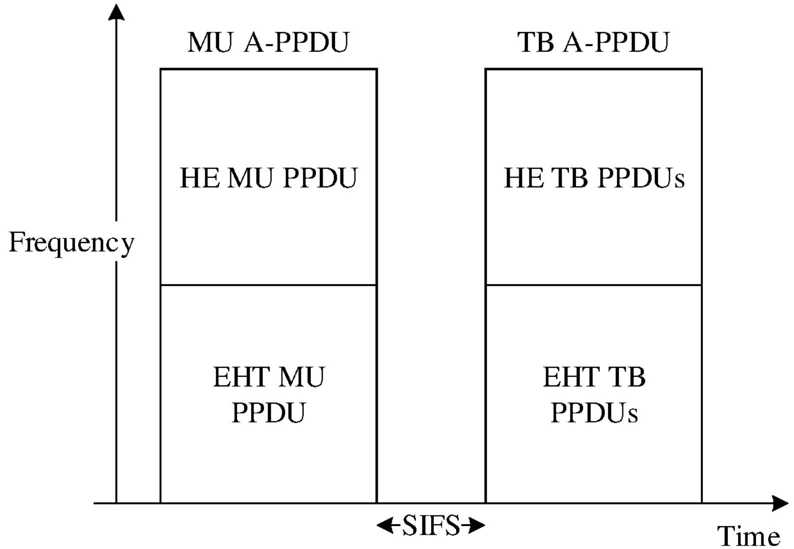
FIG. 11

ACCESS POINT, STATION, AND WIRELESS COMMUNICATION METHOD

CROSS-REFERENCE TO RELATED APPLICATIONS

The present application is a continuation of International Application No. PCT/CN2022/112205 filed on Aug. 12, 2022, which claims the benefit of priority to Singaporean patent application No. 10202108883P, filed on Aug. 13, 2021. The disclosures of the above applications are hereby incorporated by reference in their entireties.

BACKGROUND

Communication systems such as wireless communication systems are widely deployed to provide various types of communication content such as voice, video, packet data, messaging, broadcast, and so on. These communication systems may be multiple-access systems capable of supporting communication with multiple users by sharing available system resources (such as, time, frequency, and power). A wireless network, for example a wireless local area network (WLAN), such as a Wi-Fi (institute of electrical and electronics engineers (IEEE) 802.11) network may include an access point (AP) that may communicate with one or more stations (STAs) or mobile devices. The WLAN enables a user to wirelessly access an internet based on radio frequency technology in a home, an office, or a specific service area using a portable terminal such as a personal digital assistant (PDA), a laptop computer, a portable multimedia player (PMP), a smartphone, etc. The AP may be coupled to a network, such as the internet, and may enable a mobile device to communicate via the network (or communicate with other devices coupled to the AP). A wireless device may communicate with a network device bi-directionally. For example, in a WLAN, a STA may communicate with an associated AP via downlink and uplink. The downlink may refer to a communication link from the AP to the STA, and the uplink may refer to a communication link from the STA to the AP.

IEEE 802.11 TGbe is developing a new IEEE 802.11 amendment which defines extremely high throughput (EHT) physical layer (PHY) and medium access control (MAC) layers capable of supporting a maximum throughput of at least 30 Gbps. To this end, it has been proposed to increase maximum channel bandwidth to 320 MHz. In addition, it is expected that high efficiency (HE) STAs will exist with extremely high throughput (EHT) STAs in a same EHT basic service set (BSS). In order to maximize throughput of an EHT BSS with large BW (e.g., 320 MHz), aggregate physical layer protocol data unit (A-PPDU) has been proposed. However, it is still an open issue how to efficiently achieve a trigger-based (TB) A-PPDU transmission.

SUMMARY

The present disclosure relates to the field of communication systems, and more particularly, to an access point (AP), a station (STA), and a wireless communication method, which can provide a good communication performance and/or provide high reliability.

In a first aspect of the present disclosure, a wireless communication method includes transmitting, by an access point (AP), a physical layer protocol data unit (PPDU) which carries one or more trigger frames to solicit a trigger-based (TB) aggregate PPDU (A-PPDU) transmission from a plurality of stations, wherein the PPDU is a non-high throughput (non-HT) duplicate PPDU in response to that the bandwidth of the PPDU is 320 MHz.

In a second aspect of the present disclosure, a wireless communication method includes receiving, by an extremely high throughput (EHT) station (STA), a physical layer protocol data unit (PPDU) which carries one or more trigger frames for performing a high efficiency (HE) trigger-based (TB) PPDU transmission or an EHT TB PPDU transmission of a TB aggregate PPDU (A-PPDU) transmission to an access point (AP), wherein the PPDU is a non-high throughput (non-HT) duplicate PPDU in response to that the bandwidth of the PPDU is 320 MHz.

In a third aspect of the present disclosure, a wireless communication method includes transmitting, by an access point (AP), a physical layer protocol data unit (PPDU) which carries two or more aggregate medium access control (MAC) protocol data units (A-MPDUs) to solicit a trigger-based (TB) aggregate PPDU (A-PPDU) transmission from a plurality of stations (STAs), wherein each A-MPDU comprises one or more triggered response scheduling (TRS) Control subfield for configuring any of one or more high efficiency (HE) TB PPDU and one or more extremely high efficiency (EHT) TB PPDU of the TB A-PPDU.

In a fourth aspect of the present disclosure, a wireless communication method includes receiving, by an extremely high throughput (EHT) station (STA), a physical layer protocol data unit (PPDU) which carries two or more aggregate medium access control (MAC) protocol data units (A-MPDUs) for performing any of one or more high efficiency (HE) trigger-based (TB) PPDU transmission and one or more EHT TB PPDU transmission of a TB aggregate PPDU (A-PPDU) transmission to an access point (AP), wherein each A-MPDU comprises one or more triggered response scheduling (TRS) Control subfield for configuring any of the one or more HE TB PPDU and the one or more EHT TB PPDU of the TB A-PPDU.

In a fifth aspect of the present disclosure, an access point (AP), including a memory; a transceiver; and a processor coupled to the memory and the transceiver, wherein the processor is configured to perform the afore-described method according to the first aspect of the present disclosure.

In a sixth aspect of the present disclosure, a station (STA), including: a memory; a transceiver; and a processor coupled to the memory and the transceiver, wherein the processor is configured to perform the afore-described method according to the second aspect of the present disclosure.

In an eighth aspect of the present disclosure, an access point (AP), including a memory; a transceiver; and a processor coupled to the memory and the transceiver, wherein the processor is configured to perform the afore-described method according to the third aspect of the present disclosure.

In a ninth aspect of the present disclosure, a station (STA), including: a memory; a transceiver; and a processor coupled to the memory and the transceiver, wherein the processor is configured to perform the afore-described method according to the fourth aspect of the present disclosure.

In a tenth aspect of the present disclosure, a computer program causes a computer to execute the above method.

In an eleventh aspect of the present disclosure, a computer program product includes a computer program, and the computer program causes a computer to execute the above method.

In a twelfth aspect of the present disclosure, a chip includes a processor, configured to call and run a computer program stored in a memory, to cause a device in which the chip is installed to execute the above method.

In a thirteenth aspect of the present disclosure, a computer readable storage medium, in which a computer program is stored, causes a computer to execute the above method.

In a fourteenth aspect of the present disclosure, a non-transitory machine-readable storage medium has stored thereon instructions that, when executed by a computer, cause the computer to perform the above method.

BRIEF DESCRIPTION OF DRAWINGS

In order to illustrate the embodiments of the present disclosure or related art more clearly, the following figures will be described in the embodiments are briefly introduced. It is obvious that the drawings are merely some embodiments of the present disclosure, a person having ordinary skill in this field can obtain other figures according to these figures without paying the premise.

FIG. 8 is a schematic diagram illustrating EHT variant Common Info field format according to the first embodiment of the present disclosure.

FIG. 10A is a flowchart of a wireless communication method performed by an AP according to a second embodiment of the present disclosure.

FIG. 10B is a flowchart of a wireless communication method performed by a STA according to a second embodiment of the present disclosure.

FIG. 11 is a schematic diagram illustrating an exemplary example TB A-PPDU transmission according to the second embodiment of the present disclosure.

DETAILED DESCRIPTION

There is a need for an access point (AP), a station (STA), and a wireless communication method, which can solve issues in the prior art, efficiently achieve a TB A-PPDU transmission, maximize throughput of an EHT BSS with large BW (e.g., 320 MHz), provide good communication performance, and/or provide high reliability. An object of the present disclosure is to propose a wireless communication method, an access point (AP) and a station (STA), which can solve issues in the prior art, efficiently achieve a TB A-PPDU transmission, maximize throughput of an EHT BSS with large BW (e.g., 320 MHz), provide good communication performance, and/or provide high reliability.

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

The following table includes some abbreviations, which may be used in some embodiments of the present disclosure:

| Abbreviation | Full name |
|---|---|
| IEEE | Institute of Electrical and Electronics Engineers |
| WLAN | Wireless local area network |
| BSS | Basic service set |
| AP | Access point |
| STA | Station |
| PHY | Physical layer |
| MAC | Medium access control layer |
| MPDU | MAC protocol data unit |

-continued

| Abbreviation | Full name |
|---|---|
| PPDU | Physical layer protocol data unit |
| A-PPDU | Aggregate PPDU |
| HT | High throughput |
| HE | High efficiency |
| EHT | Extremely high throughput |
| MU | Multi-user |
| OFDMA | Orthogonal frequency division multiple access |
| TB | Trigger based |
| L-LTF | Non-HT Long Training field |
| L-STF | Non-HT Short Training field |
| L-SIG | Non-HT SIGNAL field |
| RL-SIG | Repeated L-SIG |
| HE-SIG-A | HE SIGNAL A field |
| U-SIG | Universal SIGNAL field |
| HE-STF | HE Short Training field |
| HE-LTF | HE Long Training field |
| EHT-STF | EHT Short Training field |
| EHT-LTF | EHT Long Training field |
| PE | Packet Extension field |
| BW | Bandwidth |
| GI | Guard interval |
| LDPC | Low density parity code |
| MCS | Modulation and coding scheme |
| RU | Resource unit |
| MRU | Multiple resource unit |
| SIFS | Short interframe spacing |
| TRS | Triggered response scheduling |

Figure 1:
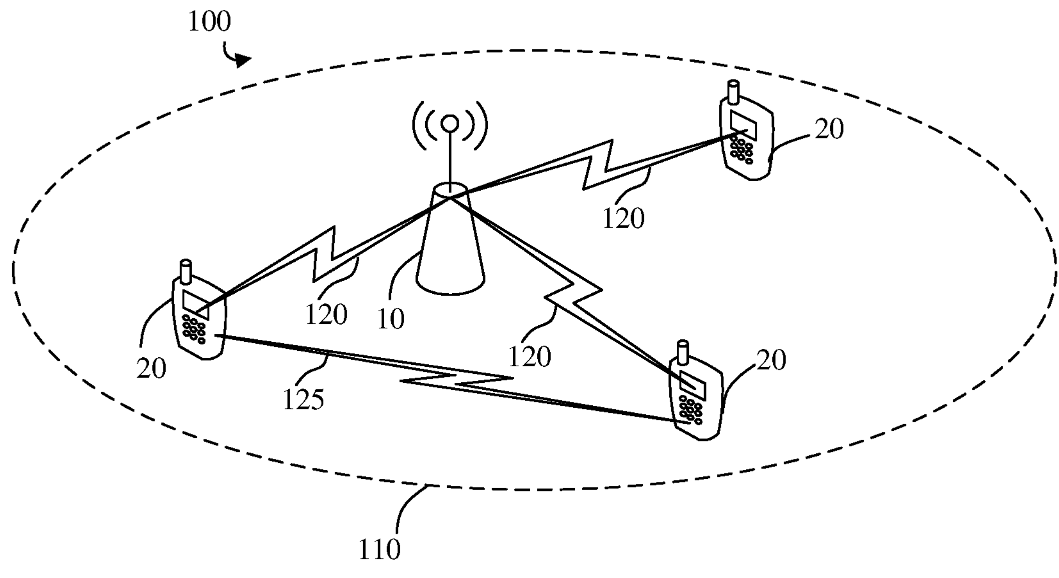
FIG. 1 is a schematic diagram illustrating an example of a wireless communications system according to an embodiment of the present disclosure.

FIG. 1 illustrates an example of a wireless communications system according to an embodiment of the present disclosure. The wireless communications system may be an example of a wireless local area network (WLAN) 100 (also known as a Wi-Fi network) (such as next generation, next big thing (NBT), ultra-high throughput (UHT) or extremely-high throughput (EHT) Wi-Fi network) configured in accordance with various aspects of the present disclosure. As described herein, the terms next generation, NBT, UHT, and EHT may be considered synonymous and may each correspond to a Wi-Fi network supporting a high volume of space-time-streams. The WLAN 100 may include an AP 10 and multiple associated STAs 20, which may represent devices such as mobile stations, personal digital assistant (PDAs), other handheld devices, netbooks, notebook computers, tablet computers, laptops, display devices (such as TVs, computer monitors, etc.), printers, etc. The AP 10 and the associated stations 20 may represent a basic service set (BSS) or an extended service set (ESS). The various STAs 20 in the network can communicate with one another through the AP 10. Also illustrated is a coverage area 110 of the AP 10, which may represent a basic service area (BSA) of the WLAN 100. An extended network station (not shown) associated with the WLAN 100 may be connected to a wired or wireless distribution system that may allow multiple APs 10 to be connected in an ESS.

In some embodiments, a STA 20 may be located in the intersection of more than one coverage area 110 and may associate with more than one AP 10. A single AP 10 and an associated set of STAs 20 may be referred to as a BSS. An ESS is a set of connected BSSs. A distribution system (not shown) may be used to connect APs 10 in an ESS. In some cases, the coverage area 110 of an AP 10 may be divided into sectors (also not shown). The WLAN 100 may include APs 10 of different types (such as a metropolitan area, home network, etc.), with varying and overlapping coverage areas 110. Two STAs 20 also may communicate directly via a direct wireless link 125 regardless of whether both STAs 20 are in the same coverage area 110. Examples of direct wireless links 120 may include Wi-Fi direct connections, Wi-Fi tunneled direct link setup (TDLS) links, and other group connections. STAs 20 and APs 10 may communicate according to the WLAN radio and baseband protocol for physical and media access control (MAC) layers from IEEE 802.11 and versions including, but not limited to, 802.11b, 802.11g, 802.11a, 802.11n, 802.11ac, 802.11ad, 802.11ah, 802.11ax, 802.11ay, etc. In some other implementations, peer-to-peer connections or ad hoc networks may be implemented within the WLAN 100.

Figure 2:
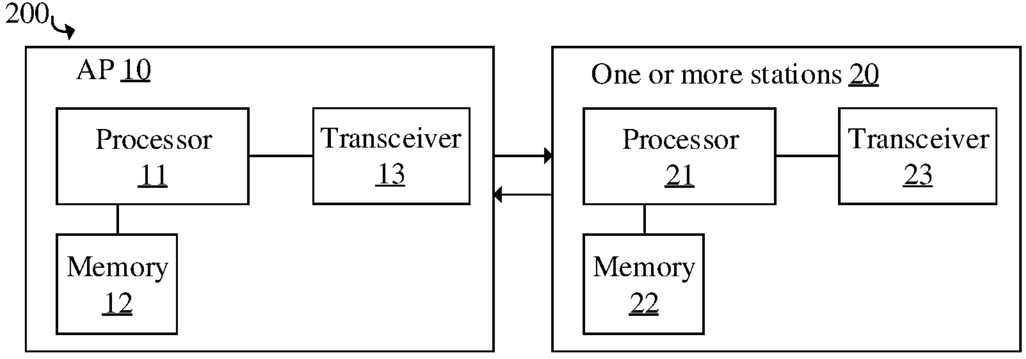
FIG. 2 is a block diagram of one or more stations (STAs) and an access point (AP) of communication in a wireless communications system according to an embodiment of the present disclosure.

FIG. 2 illustrates one or more stations (STAs) 20 and an access point (AP) 10 of communication in a wireless communications system 200 according to an embodiment of the present disclosure. FIG. 2 illustrates that, the wireless communications system 200 includes an access point (AP) 10 and one or more stations (STAs) 20. The AP 10 may include a memory 12, a transceiver 13, and a processor 11 coupled to the memory 12, the transceiver 13. The one or more STAs 20 may include a memory 22, a transceiver 23, and a processor 21 coupled to the memory 22, the transceiver 23. The processor 11 or 21 may be configured to implement proposed functions, procedures and/or methods described in this description. Layers of radio interface protocol may be implemented in the processor 11 or 21. The memory 12 or 22 is operatively coupled with the processor 11 or 21 and stores a variety of information to operate the processor 11 or 21. The transceiver 13 or 23 is operatively coupled with the processor 11 or 21, and the transceiver 13 or 23 transmits and/or receives a radio signal.

The processor 11 or 21 may include application-specific integrated circuit (ASIC), other chipset, logic circuit and/or data processing device. The memory 12 or 22 may include read-only memory (ROM), random access memory (RAM), flash memory, memory card, storage medium and/or other storage device. The transceiver 13 or 23 may include baseband circuitry to process radio frequency signals. When the embodiments are implemented in software, the techniques described herein can be implemented with modules (e.g., procedures, functions, and so on) that perform the functions described herein. The modules can be stored in the memory 12 or 22 and executed by the processor 11 or 21. The memory 12 or 22 can be implemented within the processor 11 or 21 or external to the processor 11 or 21 in which case those can be communicatively coupled to the processor 11 or 21 via various means as is known in the art.

Figure 3A:
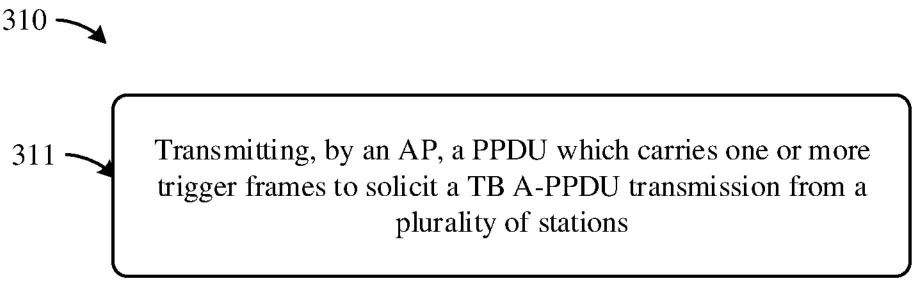
FIG. 3A is a flowchart of a wireless communication method performed by an AP according to a first embodiment of the present disclosure.
Figure 3B:
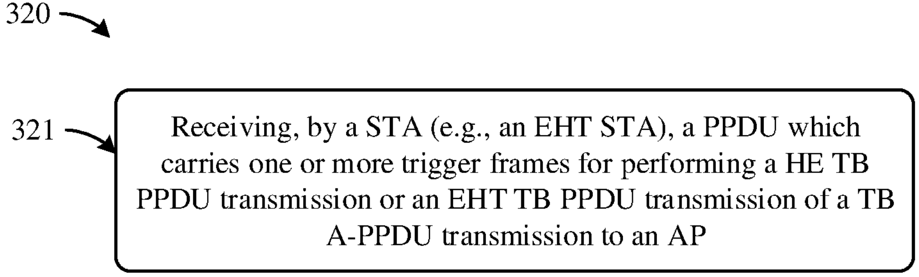
FIG. 3B is a flowchart of a wireless communication method performed by a STA according to a first embodiment of the present disclosure.

FIG. 3A illustrates a wireless communication method 310 performed by an AP according to a first embodiment of the present disclosure. FIG. 3B illustrates a wireless communication method 320 performed by a STA according to a first embodiment of the present disclosure. Referring to FIGS. 3A and 3B in conjunction with FIG. 2, in block 311 of the method 310, the AP 10 transmits a PPDU which carries one or more trigger frames to solicit a TB A-PPDU transmission from a plurality of STAs 20; in block 321 of the method 320, the STA 20 (e.g., an EHT STA) receives a PPDU which carries one or more trigger frames for performing a HE TB PPDU transmission or an EHT TB PPDU transmission of a TB A-PPDU transmission to an AP 10. This can solve issues in the prior art, efficiently achieve a TB A-PPDU transmission, maximize throughput of an EHT BSS with large BW (e.g., 320 MHz), provide good communication performance, and/or provide high reliability.

According to the first embodiment, an AP may transmit a PPDU which carries one or more Trigger frames in an A-MPDU to solicit a TB A-PPDU transmission from HE STAs and EHT STAs. The STA may receive the PPDU for performing a HE TB PPDU transmission or an EHT TB PPDU transmission of the TB A-PPDU transmission to the AP. If more than one Trigger frames are included in the A-MPDU, they shall be the same.

In some embodiments, when the PPDU bandwidth is 160 MHz, the PPDU is a non-HT duplicate PPDU, a VHT PPDU, a HE SU PPDU or a HE ER SU PPDU (where SU stands for single-user and ER stands for extended-range); when the PPDU bandwidth is 320 MHz, the PPDU is a non-HT duplicate PPDU. The non-HT duplicate PPDU, the VHT PPDU, the HE SU PPDU and the HE ER SU PPDU support 160 MHz PPDU transmission. The non-HT duplicate PPDU also supports 320 MHz PPDU transmission. The non-HT duplicate PPDU can be used for 160 MHz or 320 MHz PPDU transmission while the VHT PPDU, the HE SU PPDU and the HE ER SU PPDU can only be used for 160 MHz PPDU transmission.

Figure 4:
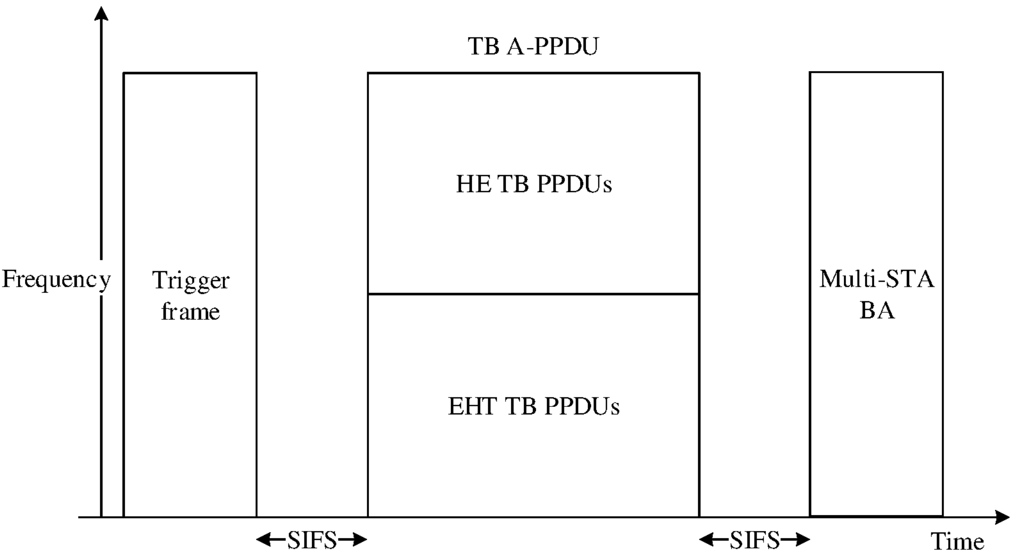
FIG. 4 is a schematic diagram illustrating an exemplary example TB A-PPDU transmission according to the first embodiment of the present disclosure.

An exemplary example TB A-PPDU transmission according to the first embodiment is shown in FIG. 4. In the received Trigger frame, a HE STA may be addressed by a HE variant User Info field; while an EHT STA may be addressed by a HE variant User Info field or an EHT variant User Info field. The EHT STA can transmit a HE TB PPDU or an EHT TB PPDU of the TB A-PPDU while the HE STA can only transmit a HE TB PPDU of the TB A-PPDU. A HE STA or an EHT STA addressed by an HE variant User Info field of the received Trigger frame transmits a HE TB PPDU; while an EHT STA addressed by an EHT variant User Info field of the received Trigger frame transmits an EHT TB PPDU. All transmitted HE TB PPDUs and EHT TB PPDUs constitute a TB A-PPDU. Each of the HE TB PPDUs and EHT TB PPDUs may carry QoS data frames and/or management frames in an A-MPDU. The AP will transmit one or more BlockAck frames (e.g., a Multi-STA BlockAck frame) as an acknowledgement to the received A-MPDUs.

Figure 5A:
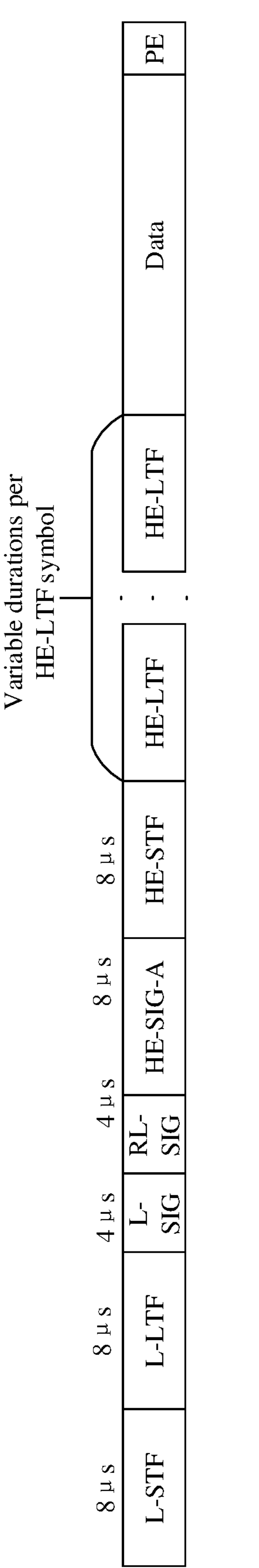
FIG. 5A is a schematic diagram illustrating an example format of HE TB PPDU according to the first embodiment of the present disclosure.
Figure 5B:
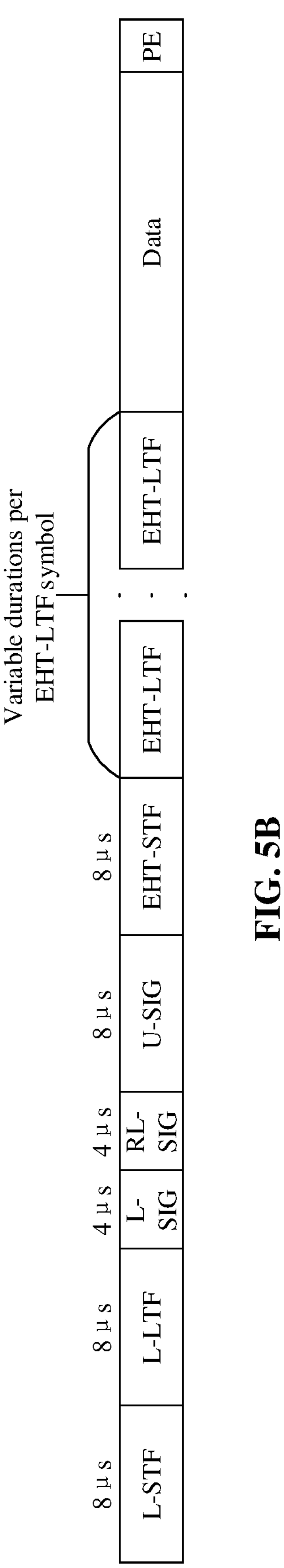
FIG. 5B is a schematic diagram illustrating an example format of EHT TB PPDU according to the first embodiment of the present disclosure.

The HE TB PPDU and EHT TB PPDU formats as shown in FIG. 5A and FIG. 5B are used for a transmission that is a response to the Trigger frame from the AP. In a HE TB PPDU, the L-STF, L-LTF, L-SIG, RL-SIG and HE-SIG-A are called pre-HE modulated fields while the HE-STF, HE-LTF, Data field and PE are called HE modulated fields. In an EHT TB PPDU, the L-STF, L-LTF, L-SIG, RL-SIG and U-SIG are called pre-EHT modulated fields while the EHT-STF, EHT-LTF, Data field and PE are called EHT modulated fields.

Each HE-LTF or EHT-LTF symbol has the same GI duration as each data symbol, which is 0.8 ρs, 1.6 ρs or 3.2 ρs. The HE-LTF includes three types: 1×HE-LTF, 2×HE-LTF and 4×HE-LTF. Similarly, the EHT-LTF includes three types: 1×EHT-LTF, 2×EHT-LTF and 4×EHT-LTF. The duration of each 1×HE-LTF/EHT-LTF, 2×HE-LTF/EHT-LTF or 4×HE-LTF/EHT-LTF symbol without GI is 3.2 ρs, 6.4 ρs or 12.8 ρs. Each data symbol without GI is 12.8 ρs. The PE duration of a HE TB PPDU is 0 ρs, 4 ρs, 8 ρs, 12 ρs or 16 ρs; while the PE duration of an EHT TB PPDU is 0 ρs, 4 ρs, 8 ρs, 12 ρs, 16 ρs or 20 ρs.

In order to align HE TB PPDU and EHT TB PPDU, in a TB A-PPDU, the HE-LTF field of each HE TB PPDU has a same symbol duration and a same GI duration as the EHT-LTF field of each EHT TB PPDU. Further, the number of HE-LTF symbols in each HE TB PPDU is the same as the number of EHT-LTF symbols in each EHT TB PPDU. As a result, the pre-HE modulated fields of HE TB PPDUs and the pre-EHT modulated fields of EHT TB PPDUs can be kept orthogonal in frequency domain symbol-by-symbol.

Figure 6A:
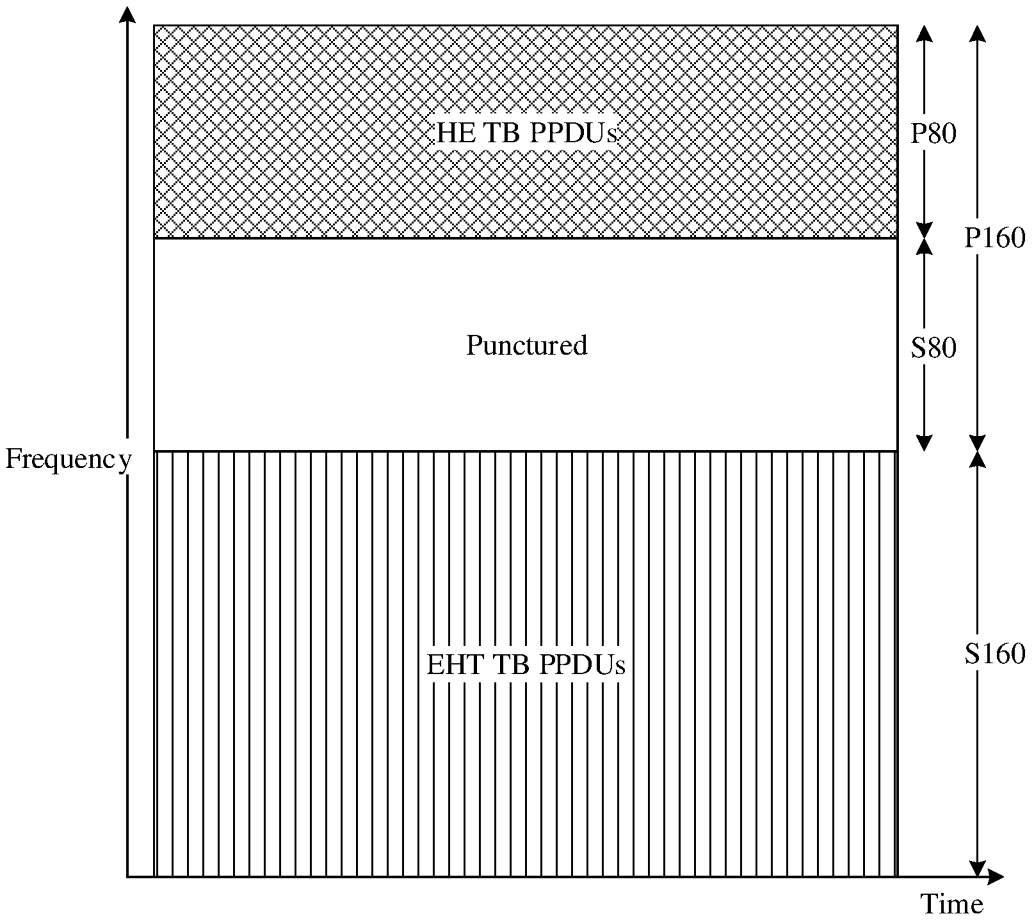
FIG. 6A is a schematic diagram illustrating an example for BW allocation in a 320 MHz TB A-PPDU according to the first embodiment of the present disclosure.
Figure 6B:
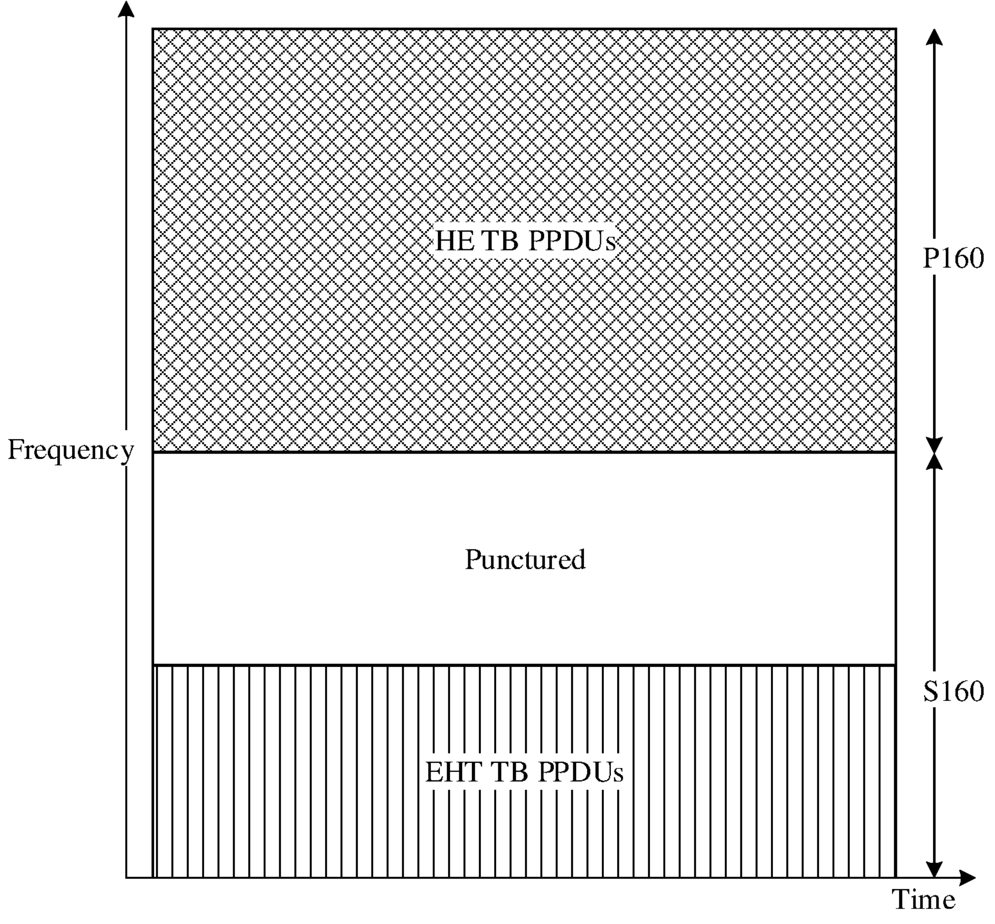
FIG. 6B is a schematic diagram illustrating another example for BW allocation in a 320 MHz TB A-PPDU according to the first embodiment of the present disclosure.
Figure 6C:
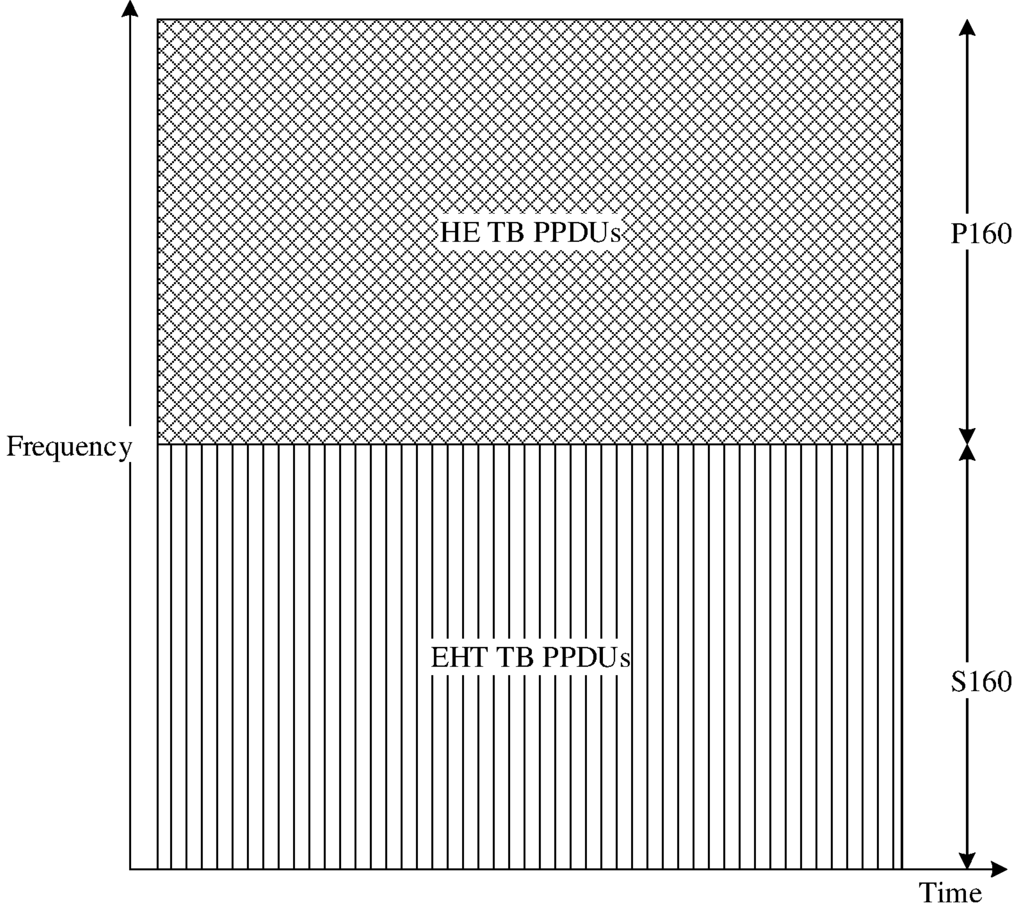
FIG. 6C is a schematic diagram illustrating yet another example for BW allocation in a 320 MHz TB A-PPDU according to the first embodiment of the present disclosure.

There may have the following three examples for BW allocation in a 320 MHz TB A-PPDU, as illustrated in FIG. 6A, FIG. 6B and FIG. 6C:

When secondary 80 MHz channel (S80) is punctured, BW allocated to HE TB PPDUs is primary 80 MHz channel (P80) and BW allocated to EHT TB PPDUs is secondary 160 MHz channel (S160), as illustrated in FIG. 6A.

When one of two 80 MHz frequency subblocks of S160 is punctured, BW allocated to HE TB PPDUs is primary 160 MHz channel (P160) and BW allocated to EHT TB PPDUs is the other 80 MHz frequency subblock of S160, as illustrated in FIG. 6B.

When none of 80 MHz frequency subblocks is punctured, BW allocated to HE TB PPDUs is P160 and BW allocated to EHT TB PPDUs is S160, as illustrated in FIG. 6C.

Figure 7:
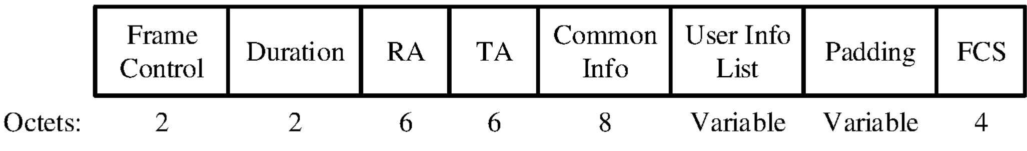
FIG. 7 is a schematic diagram illustrating Trigger frame format according to the first embodiment of the present disclosure.

The Trigger frame format is shown in FIG. 7, which includes a Common Info field and a User Info List field including one or more User Info field. The formats of the Common Info field and User Info field depend on the type of Trigger frame.

Common Info Field

The Common Info field of Trigger frame has two variants: HE variant and EHT variant. According to the first embodiment, the Common Info field of a Trigger frame is interpreted differently by HE STAs and EHT STAs. A HE STA interprets the Common Info field as HE variant. An EHT STA interprets the Common Info field as HE variant if B54 and B55 in the Common Info field are equal to 1; and interprets the Common Info field as EHT variant otherwise. The EHT variant Common Info field format is shown in FIG. 8.

According to the first embodiment, the UL BW subfield indicates the bandwidth in the HE-SIG-A of the solicited HE TB PPDU, and/or the UL BW subfield of the Common Info field along with the UL BW Extension subfield of the Special User Info field indicates the bandwidth in the U-SIG of the solicited EHT TB PPDU.

According to the first embodiment, the HE/EHT P160 subfield is set to 0 to indicate that the solicited TB PPDU on the P160 is an EHT TB PPDU and is set to 1 to indicate that the solicited TB PPDU on the P160 is an HE TB PPDU. The Special User Info Field Absent subfield is set to 1 to indicate that the Special User Info field is not present in the Trigger frame and is set to 0 to indicate that the Special User Info field is present in the Trigger frame. The Special User Info field, if present, is located immediately after the Common Info field of the Trigger frame and carries the non-derived subfields of the U-SIG of the solicited EHT TB PPDU.

According to the first embodiment, an EHT STA shall not send an HE TB PPDU on the S160. As a result, the HE/EHT P160 subfield of the Common Info field is 0 and the Special User Info Field Absent subfield of the Common Info field is 0 in a Trigger frame soliciting an EHT TB PPDU. The HE/EHT P160 subfield of the Common Info field is 1 and the Special User Info Field Absent subfield of the Common Info field is 0 in a Trigger frame soliciting a TB A-PPDU. The HE/EHT P160 subfield of the Common Info field is 1 and the Special User Info Field Absent subfield of the Common Info field is 1 in a Trigger frame soliciting a HE TB PPDU.

According to the first embodiment, the LDPC Extra Symbol Segment subfield of the Common Info field indicates the status of the LDPC extra symbol segment. How the LDPC Extra Symbol Segment subfield is set depends on whether the Trigger frame is used to solicit a HE TB PPDU, an EHT TB PPDU or a TB A-PPDU.

When the Trigger frame is used to solicit a HE TB PPDU transmission, the LDPC Extra Symbol Segment subfield shall be set to a first value (e.g., 1) if the LDPC extra symbol segment is present in the solicited HE TB PPDUs and set to a second value (e.g., 0) otherwise. In other words, the LDPC Extra Symbol Segment subfield shall be set to the first value (e.g., 1) if the calculations described in the LDPC encoding process indicate the need for an LDPC extra symbol segment for any LDPC encoded user solicited by the AP for an HE TB PPDU transmission. In this circumstance, the first value and the second value may be 0 and 1, respectively, that is, the LDPC Extra Symbol Segment subfield is set to 0 if the LDPC extra symbol segment is present in the solicited HE TB PPDUs and is set to 1 otherwise, depending on actual needs.

When the Trigger frame is used to solicit an EHT TB PPDU transmission, the LDPC Extra Symbol Segment subfield shall be set to a first value (e.g., 1) if the LDPC extra symbol segment is present in the solicited EHT TB PPDUs and set to a second value (e.g., 0) otherwise. In other words, the LDPC Extra Symbol Segment subfield shall be set to the first value (e.g., 1) if the calculations described in the LDPC encoding process indicate the need for an LDPC extra symbol segment for any LDPC encoded user solicited by the AP for an EHT TB PPDU transmission. In this circumstance, the first value and the second value may be 0 and 1, respectively, that is, the LDPC Extra Symbol Segment subfield is set to 0 if the LDPC extra symbol segment is present in the solicited EHT TB PPDUs and is set to 1 otherwise, depending on actual needs.

When the Trigger frame is used to solicit a TB A-PPDU transmission, the LDPC Extra Symbol Segment subfield shall be set to a first value (e.g., 1) if the LDPC extra symbol segment is present in the solicited EHT TB PPDUs and/or the solicited HE TB PPDUs and set to a second value (e.g., 0) otherwise. In other words, the LDPC Extra Symbol Segment subfield shall be set to the first value (e.g., 1) if the calculations described in the LDPC encoding process indicate the need for an LDPC extra symbol segment for any LDPC encoded user solicited by the AP for a HE or EHT TB PPDU transmission. By doing so, there is no need of indicating the presence of LDPC extra symbol segment for solicited HE TB PPDUs and EHT TB PPDUs, respectively, in a Trigger frame. In this circumstance, the first value and the second value may be 0 and 1, respectively, that is, the LDPC Extra Symbol Segment subfield is set to 0 if the LDPC extra symbol segment is present in the solicited EHT TB PPDUs and/or the solicited HE TB PPDUs and is set to 1 otherwise, depending on actual needs.

The foregoing calculations described in the LDPC encoding process may be referred to 27.3.12.5.2 LDPC coding of the IEEE Std 802.11ax-2021 for more details.

User Info Field

The User Info field of Trigger frame has two variants: HE variant and EHT variant. An EHT STA addressed by a HE variant User Info field of a Trigger frame may respond with a HE TB PPDU. An EHT STA addressed by an EHT variant User Info field of a Trigger frame may respond with an EHT TB PPDU.

Figure 9A:
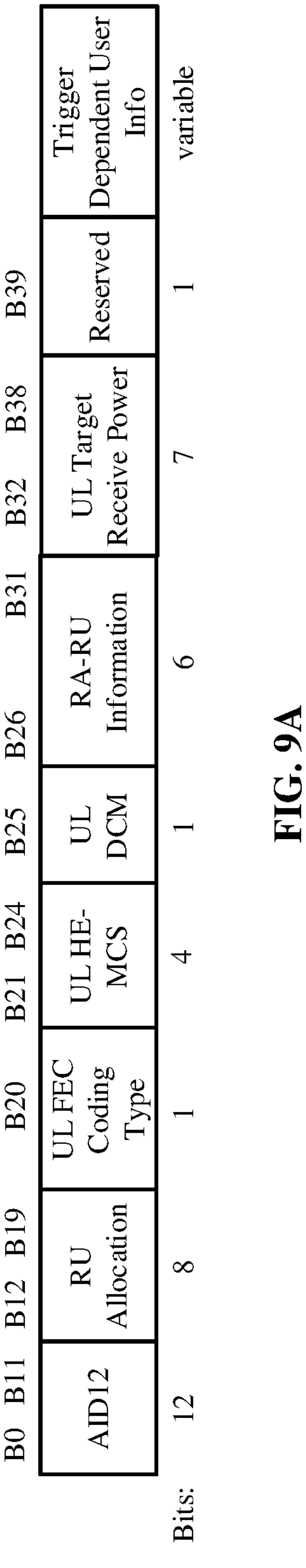
FIG. 9A is a schematic diagram illustrating an example format of HE variant User Info field according to the first embodiment of the present disclosure.
Figure 9B:
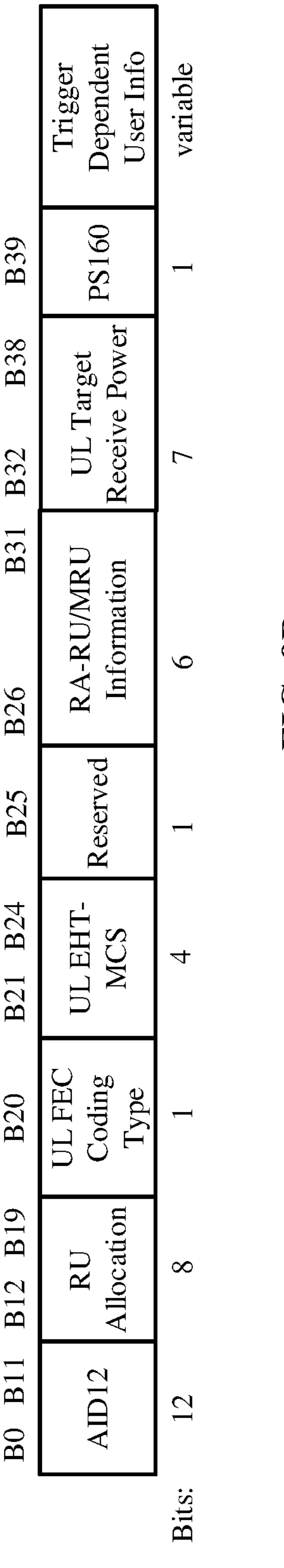
FIG. 9B is a schematic diagram illustrating an example format of EHT variant User Info field according to the first embodiment of the present disclosure.

An example format of the HE variant User Info field is illustrated in FIG. 9A; and an example format of the EHT variant User Info field is illustrated in FIG. 9B. The B25 is reserved and set to 0 for an EHT variant User Info field and is the UL DCM subfield for a HE variant User Info field. The B39 is reserved and set to 0 for an HE variant User Info field and is the PS160 subfield for an EHT variant User Info field. The User Info field is an HE variant if the B39 of the User Info field is set to 0 and the HE/EHT P160 subfield of the Common Info field is set to 1 in the Trigger frame; otherwise, it is an EHT variant.

FIG. 10A illustrates a wireless communication method 1010 performed by an AP according to a second embodiment of the present disclosure. FIG. 10B illustrates a wireless communication method 1020 performed by a STA according to a second embodiment of the present disclosure. Referring to FIGS. 10A and 10B in conjunction with FIG. 2, in block 1011 of the method 1010, the AP 10 transmits a PPDU which carries two or more A-MPDUs to solicit a TB A-PPDU transmission from a plurality of STAs 20, wherein each A-MPDU comprises one or more TRS Control subfield for configuring any of one or more HE TB PPDU and one or more EHT TB PPDU of the TB A-PPDU; in block 1021 of the method 1020, the STA 20 (e.g., an EHT STA) receives a PPDU which carries two or more A-MPDUs for performing any of one or more HE TB PPDU transmission and one or more EHT TB PPDU transmission of a TB A-PPDU transmission to an AP 10, wherein each A-MPDU comprises one or more TRS Control subfield for configuring any of the one or more HE TB PPDU and the one or more EHT TB PPDU of the TB A-PPDU. This can solve issues in the prior art, efficiently achieve a TB A-PPDU transmission, maximize throughput of an EHT BSS with large BW (e.g., 320 MHz), provide good communication performance, and/or provide high reliability.

According to the second embodiment, an AP may transmit a PPDU (e.g., a MU A-PPDU) which carries two or more A-MPDUs to solicit a TB A-PPDU transmission from HE STAs and EHT STAs. The STA may receive the PPDU for performing a TB PPDU transmission to the AP. If the STA is an EHT STA, the STA can perform a HE TB PPDU transmission or an EHT TB PPDU transmission of TB A-PPDU transmission; if the STA is a HE STA, the STA can only perform a HE TB PPDU transmission of TB A-PPDU transmission.

Specifically, the AP may transmit a MU A-PPDU which carries A-MPDUs containing TRS Control subfields to solicit a TB A-PPDU transmission from HE STAs and EHT STAs, wherein an A-MPDU containing TRS Control subfields and addressed to a HE STA is transmitted in a HE MU PPDU of the MU A-PPDU and an A-MPDU containing TRS Control subfields and addressed to an EHT STA is transmitted in a HE MU PPDU or an EHT MU PPDU of the MU A-PPDU.

An exemplary example TB A-PPDU transmission according to the second embodiment is shown in FIG. 11. As indicated in FIG. 11, the PPDU transmitted by the AP is a MU A-PPDU including a HE MU PPDU and an EHT MU PPDU, a HE STA may perform a HE TB PPDU transmission of the TB A-PPDU transmission, and an EHT STA may perform a HE TB PPDU transmission of the TB A-PPDU transmission or an EHT TB PPDU transmission of the TB A-PPDU transmission. When receiving a MU A-PPDU, a HE STA addressed by an A-MPDU containing TRS Control subfields responds with a HE TB PPDU, which carries a BlockAck frame (e.g., a Multi-STA BlockAck frame or a Compressed BlockAck frame) as an acknowledgement to the received A-MPDU. An EHT STA addressed by an A-MPDU containing TRS Control subfields responds with a HE TB PPDU or an EHT TB PPDU depending on whether the A-MPDU is carried in a HE MU PPDU or an EHT MU PPDU of the MU A-PPDU, which carries a BlockAck frame (e.g., a Multi-STA BlockAck frame or a Compressed BlockAck frame) as an acknowledgement to the received A-MPDU. All the transmitted HE TB PPDUs and EHT TB PPDUs constitute a TB A-PPDU. The EHT STA can transmit a HE TB PPDU or an EHT TB PPDU of the TB A-PPDU while the HE STA can only transmit a HE TB PPDU of the TB A-PPDU.

The HE TB PPDU and EHT TB PPDU formats may be referred to FIG. 5A and FIG. 5B and related descriptions in the first embodiment of the present disclosure.

Figure 12A:
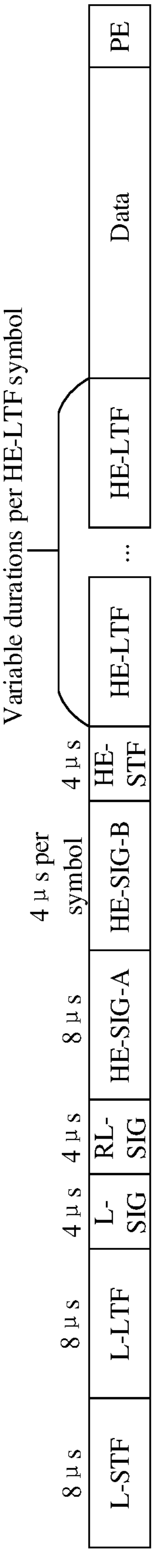
FIG. 12A is a schematic diagram illustrating an example format of HE MU PPDU according to the second embodiment of the present disclosure.
Figure 12B:
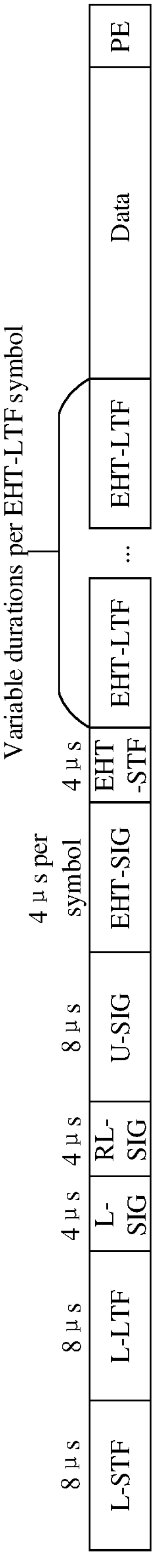
FIG. 12B is a schematic diagram illustrating an example format of EHT MU PPDU according to the second embodiment of the present disclosure.

The HE MU PPDU and EHT MU PPDU formats as shown in FIG. 12A and FIG. 12B are used for a transmission that is not a response to the Trigger frame from the AP. In a HE MU PPDU, the L-STF, L-LTF, L-SIG, RL-SIG, HE-SIG-A and HE-SIG-B are called pre-HE modulated fields while the HE-STF, HE-LTF, Data field and PE are called HE modulated fields. In an EHT MU PPDU, the L-STF, L-LTF, L-SIG, RL-SIG, U-SIG and EHT-SIG are called pre-EHT modulated fields while the EHT-STF, EHT-LTF, Data field and PE are called EHT modulated fields.

Each HE-LTF or EHT-LTF symbol has the same GI duration as each data symbol, which is 0.8 ρs, 1.6 ρs or 3.2 ρs. The HE-LTF includes three types: 1×HE-LTF, 2×HE-LTF and 4×HE-LTF. Similarly, the EHT-LTF includes three types: 1×EHT-LTF, 2×EHT-LTF and 4×EHT-LTF. The duration of each 1×HE-LTF/EHT-LTF, 2×HE-LTF/EHT-LTF or 4×HE-LTF/EHT-LTF symbol without GI is 3.2 ρs, 6.4 ρs or 12.8 ρs. Each data symbol without GI is 12.8 ρs. The PE duration of a HE MU PPDU is 0 ρs, 4 ρs, 8 ρs, 12 ρs or 16 ρs; while the PE duration of an EHT MU PPDU is 0 ρs, 4 ρs, 8 ρs, 12 ρs, 16 ρs or 20 ρs.

In order to align HE MU PPDU and EHT MU PPDU, in a MU A-PPDU, the HE-LTF field of HE MU PPDU has a same symbol duration and a same GI duration as the EHT-LTF field of the EHT MU PPDU. Further, the number of HE-LTF symbols in the HE MU PPDU is the same as the number of EHT-LTF symbols in the EHT MU PPDU; and the number of HE-SIG-B symbols in the HE MU PPDU is the same as the number of EHT-SIG symbols in the EHT MU PPDU. As a result, the pre-HE modulated fields of HE MU PPDU and the pre-EHT modulated fields of EHT MU PPDU can be kept orthogonal in frequency domain symbol-by-symbol.

Figure 13A:
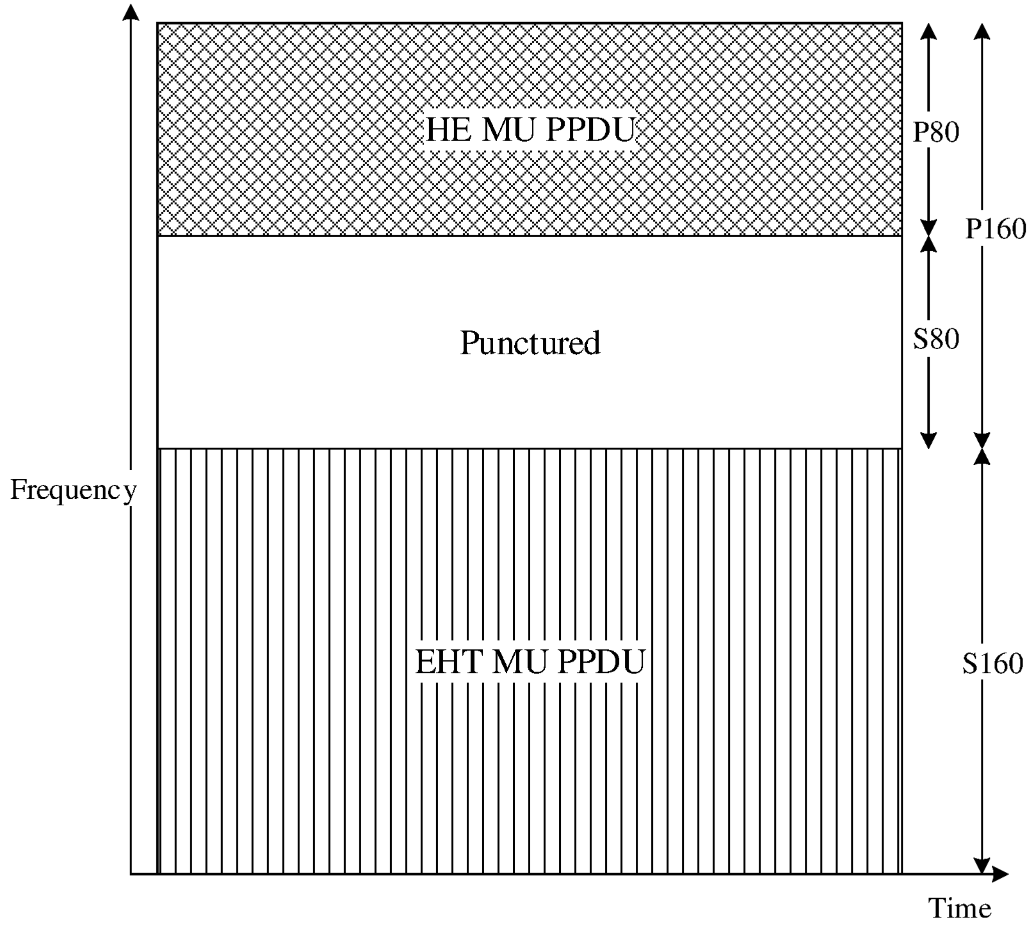
FIG. 13A is a schematic diagram illustrating an example for BW allocation in a 320 MHz MU A-PPDU according to the second embodiment of the present disclosure.
Figure 13B:
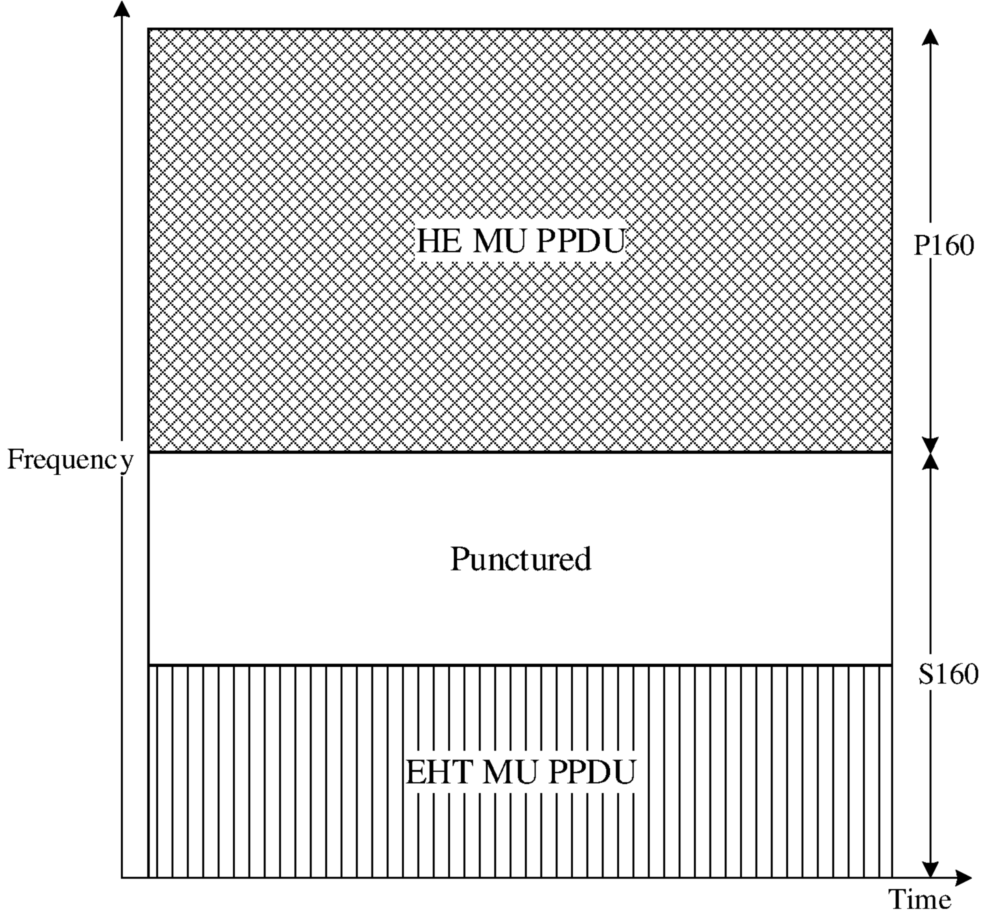
FIG. 13B is a schematic diagram illustrating another example for BW allocation in a 320 MHz MU A-PPDU according to the second embodiment of the present disclosure.
Figure 13C:
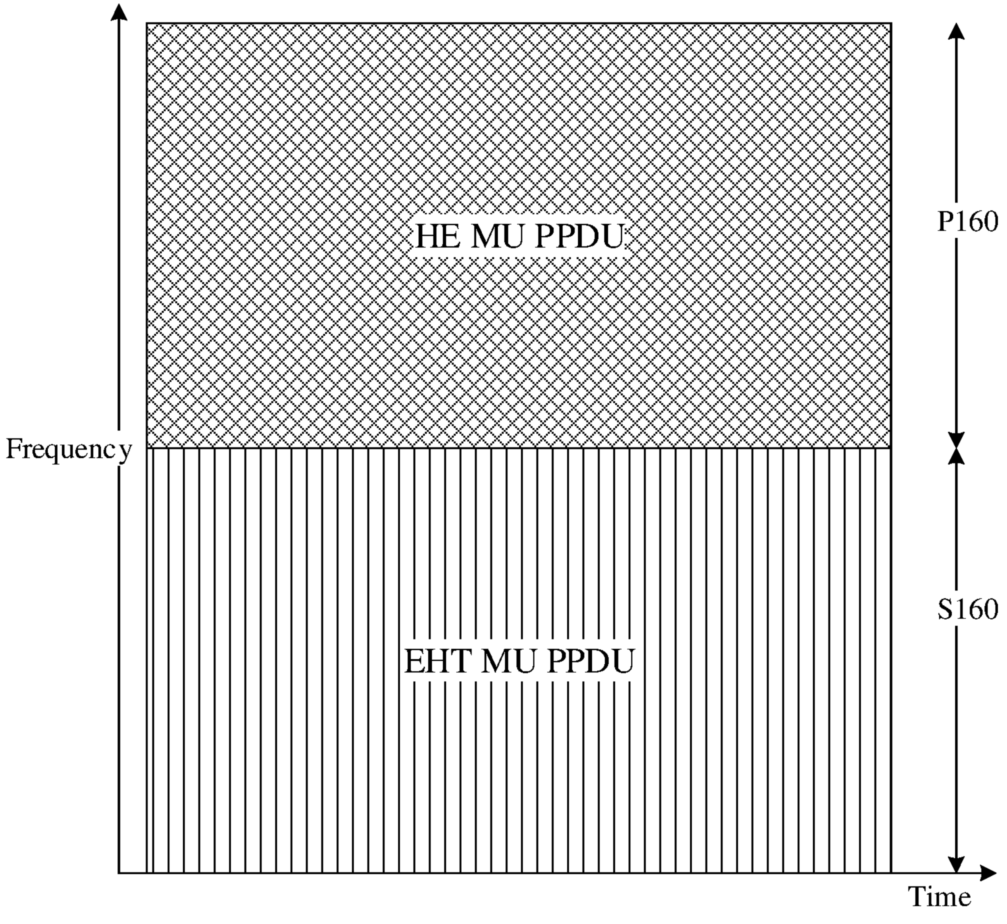
FIG. 13C is a schematic diagram illustrating yet another example for BW allocation in a 320 MHz MU A-PPDU according to the second embodiment of the present disclosure.

There may have the following three embodiments for BW allocation in a 320 MHz MU A-PPDU, as illustrated in FIG. 13A, FIG. 13B and FIG. 13C:

When secondary 80 MHz channel (S80) is punctured, BW allocated to HE MU PPDU is primary 80 MHz channel (P80) and BW allocated to EHT MU PPDU is secondary 160 MHz channel (S160), as illustrated in FIG. 13A.

When one of two 80 MHz frequency subblocks of S160 is punctured, BW allocated to HE MU PPDU is primary 160 MHz channel (P160) and BW allocated to EHT MU PPDU is the other 80 MHz frequency subblock of S160, as illustrated in FIG. 13B.

When none of 80 MHz frequency subblocks is punctured, BW allocated to HE MU PPDU is P160 and BW allocated to EHT MU PPDU is S160, as illustrated in FIG. 13C.

According to the second embodiment, the bandwidth of HE TB PPDUs of a TB A-PPDU shall be less than or equal to the bandwidth of a HE MU PPDU in a MU A-PPDU soliciting the TB A-PPDU while the bandwidth of EHT TB PPDUs in a TB A-PPDU shall be less than or equal to the bandwidth of an EHT MU PPDU in a MU A-PPDU soliciting the TB A-PPDU. For example, if a HE MU PPDU and an EHT MU PPDU in a 320 MHz MU A-PPDU have a bandwidth of 80 MHz and 160 MHz, respectively, HE TB PPDUs and EHT TB PPDUs in a 320 MHz TB A-PPDU have a bandwidth of less than or equal to 80 MHz and 160 MHz, respectively.

Figure 14A:
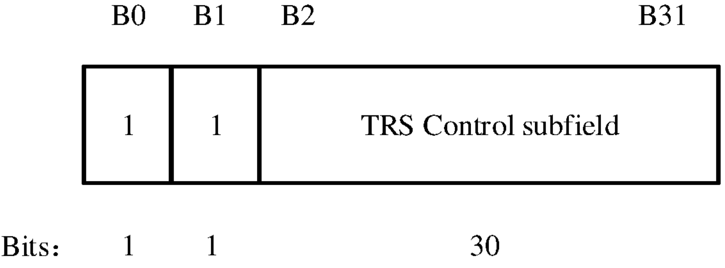
FIG. 14A is a schematic diagram illustrating an example format of HE variant HT Control field according to the second embodiment of the present disclosure.
Figure 14B:
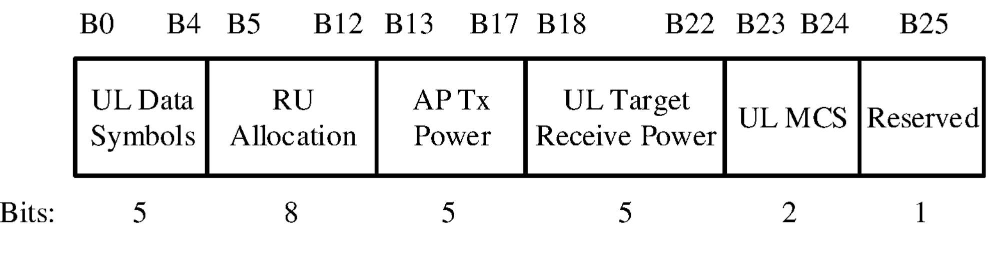
FIG. 14B is a schematic diagram illustrating an example format of Control Information field according to the second embodiment of the present disclosure.

According to the second embodiment, a TRS Control subfield is included in a HE variant HT Control field of a data or management frame in an A-MPDU. An example format of HE variant HT Control field containing a TRS Control subfield is illustrated in FIG. 14A, where both bit B0 and bit B1 are set to 1 to indicate the HE variant HT Control field. A TRS Control subfield includes a 4-bit Control ID field which is set to 0 and a 26-bit Control Information field. An example format of the Control Information field in a TRS Control subfield is shown in FIG. 14B.

According to the second embodiment, the TRS Control subfield includes an uplink (UL) Data Symbols subfield, which indicates the number of OFDM symbols in the data field of the TB PPDU response and is set to the number of OFDM symbols minus 1. In a MU A-PPDU including a HE MU PPDU and an EHT MU PPDU, the UL Data Symbols subfields of TRS Control subfields in the HE MU PPDU shall be set to a same value as the UL Data Symbols subfields of TRS Control subfields in the EHT MU PPDU, which results in endpoint alignment between HE TB PPDUs and EHT TB PPDUs in a TB A-PPDU solicited by the MU A-PPDU.

According to the second embodiment, the TRS Control subfield includes an uplink modulation and coding scheme (UL MCS) subfield for indicating modulation and coding schemes used in a TB PPDU response. How the UL MCS subfield is interpreted depends on whether the TRS Control subfield is transmitted in an EHT MU PPDU or an HE MU PPDU. When the TRS Control subfield is transmitted in an HE MU PPDU, the UL MCS subfield indicates the HE-MCS, in the range HE-MCS 0 to 3, to be used by the receiving STA for the HE TB PPDU and is set to the HE-MCS index. When the TRS Control subfield is transmitted in an EHT MU PPDU, the UL MCS subfield indicates the EHT-SIG-MCS, in the range EHT-SIG-MCS 0 to 3, to be used by the receiving STA for the EHT TB PPDU and is set to the EHT-SIG-MCS index. The EHT-MCS is a compact representation of the modulation and coding scheme used in the data field of the EHT MU PPDU and the EHT-SIG-MCS is a compact representation of the modulation and coding scheme used in the EHT-SIG field of the EHT MU PPDU. EHT-SIG-MCS 0 to 3 correspond to EHT-MCS 0, EHT-MCS 1, EHT-MCS 3, and EHT-MCS 15, respectively. By doing so, a HE TB PPDU and an EHT TB PPDU solicited by TRS Control subfields can achieve a similar data rate.

According to the second embodiment, how the RU Allocation field is interpreted depends on whether the TRS Control subfield is transmitted in an EHT MU PPDU or an HE MU PPDU. When the TRS Control subfield is transmitted in an HE MU PPDU, the RU Allocation subfield indicates the RU allocation, to be used by the receiving STA for the HE TB PPDU. When the TRS Control subfield is transmitted in an EHT MU PPDU, the RU Allocation subfield together with a PS160 bit indicates the RU or MRU allocation, to be used by the receiving STA for the EHT TB PPDU. The value of the PS160 bit is determined according to the location of the RU or MRU carrying the TRS Control subfield in the EHT MU PPDU. If the RU or MRU containing the TRS Control subfield in the EHT MU PPDU is within primary 160 MHz, the PS160 bit is set to 0; and is set to 1 otherwise.

According to the present disclosure, AP transmits a PPDU which carries one or more Trigger frame or TRS Control subfields to solicit a TB A-PPDU transmission from a plurality of stations (e.g., from HE STAs and EHT STAs).

In some embodiments of the present disclosure, when the PPDU carries the Trigger frame(s) and the PPDU bandwidth is 160 MHz, the PPDU is a non-HT duplicate PPDU, a VHT PPDU, a HE SU PPDU or a HE ER SU PPDU.

In some embodiments of the present disclosure, when the PPDU carries the Trigger frame(s) and the PPDU bandwidth is 320 MHz, the PPDU is a non-HT duplicate PPDU.

In some embodiments of the present disclosure, the Common Info field of each of the Trigger frame(s) comprises a LDPC Extra Symbol Segment subfield, which is set to a first value (e.g., 1) if the LDPC extra symbol segment is present in the solicited EHT TB PPDUs and/or the solicited HE TB PPDUs and set to a second value (e.g., 0) otherwise.

In some embodiments of the present disclosure, when the PPDU carries the TRS Control subfields, the PPDU is a MU A-PPDU.

In some embodiments of the present disclosure, an A-MPDU containing TRS Control subfields and addressed to an EHT STA is transmitted in a HE MU PPDU or an EHT MU PPDU of the MU A-PPDU. An EHT STA addressed by an A-MPDU containing TRS Control subfields responds with a HE TB PPDU or an EHT TB PPDU depending on whether the A-MPDU is carried in a HE MU PPDU or an EHT MU PPDU of the MU A-PPDU.

In some embodiments of the present disclosure, the bandwidth of HE TB PPDUs in the TB A-PPDU shall be less than or equal to the bandwidth of HE MU PPDU in the MU A-PPDU while the bandwidth of EHT TB PPDUs in the TB A-PPDU shall be less than or equal to the bandwidth of EHT MU PPDU in the MU A-PPDU.

In some embodiments of the present disclosure, the UL Data Symbols subfield of each TRS Control subfield in the MU A-PPDU shall be set to a same value.

In some embodiments of the present disclosure, how the UL MCS field of a TRS Control subfield is interpreted depends on whether the TRS Control subfield is transmitted in EHT MU PPDU or HE MU PPDU in the MU A-PPDU. When the TRS Control subfield is transmitted in HE MU PPDU, the UL MCS subfield indicates the HE-MCS, in the range HE-MCS 0 to 3, to be used by the receiving STA for HE TB PPDU and is set to the HE-MCS index. When the TRS Control subfield is transmitted in EHT MU PPDU, the UL MCS subfield indicates the EHT-SIG-MCS, in the range EHT-SIG-MCS 0 to 3, to be used by the receiving STA for EHT TB PPDU and is set to the EHT-SIG-MCS index.

Commercial interests for some embodiments are as follows. 1. solving issues in the prior art. 2. efficiently achieving a TB A-PPDU transmission. 3. maximizing throughput of an EHT BSS with large BW (e.g., 320 MHz). 4. providing a good communication performance. 5. providing a high reliability. Some embodiments of the present disclosure are used by chipset vendors, communication system development vendors, automakers including cars, trains, trucks, buses, bicycles, moto-bikes, helmets, and etc., drones (unmanned aerial vehicles), smartphone makers, communication devices for public safety use, AR/VR device maker for example gaming, conference/seminar, education purposes. Some embodiments of the present disclosure are a combination of "techniques/processes" that can be adopted in communication specification and/or communication standards such as IEEE specification and/or to standards create an end product. Some embodiments of the present disclosure propose technical mechanisms.

Figure 15:
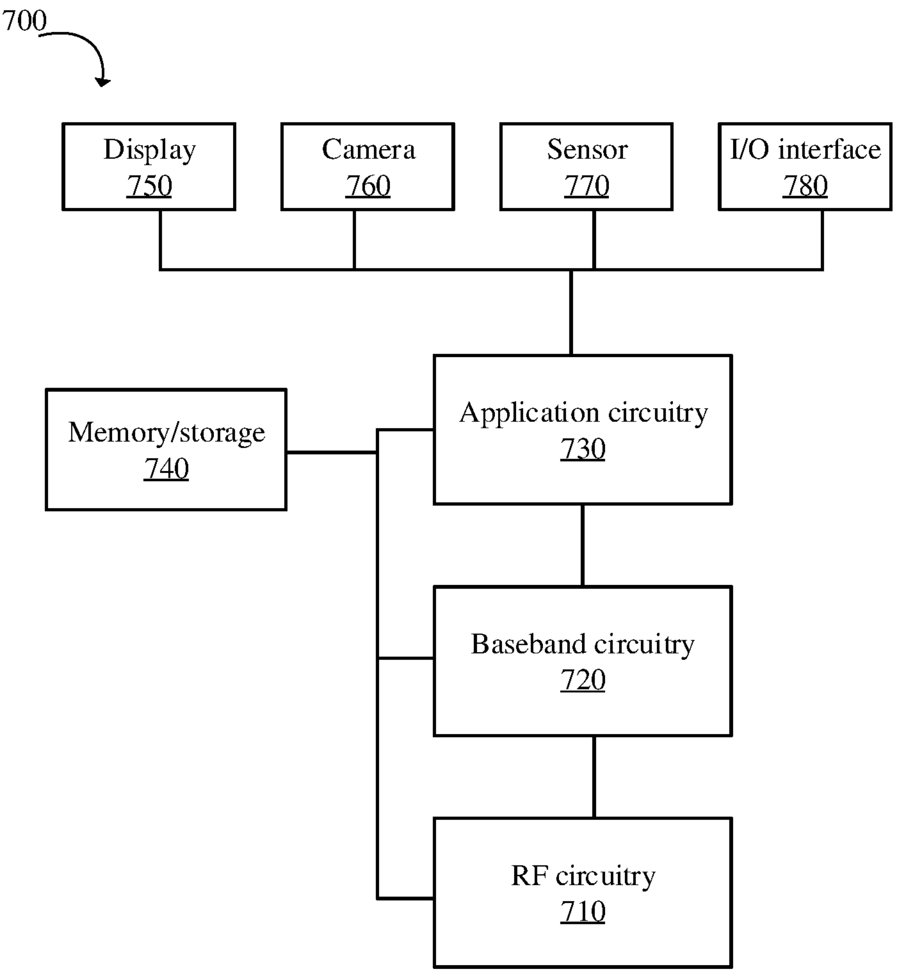
FIG. 15 is a block diagram of a system for wireless communication according to an embodiment of the present disclosure.

FIG. 15 is a block diagram of an example system 700 for wireless communication according to an embodiment of the present disclosure. Embodiments described herein may be implemented into the system using any suitably configured hardware and/or software. FIG. 15 illustrates the system 700 including a radio frequency (RF) circuitry 710, a baseband circuitry 720, an application circuitry 730, a memory/storage 740, a display 750, a camera 760, a sensor 770, and an input/output (I/O) interface 780, coupled with each other at least as illustrated. The application circuitry 730 may include a circuitry such as, but not limited to, one or more single-core or multi-core processors. The processors may include any combination of general-purpose processors and dedicated processors, such as graphics processors, application processors. The processors may be coupled with the memory/storage and configured to execute instructions stored in the memory/storage to enable various applications and/or operating systems running on the system.

The baseband circuitry 720 may include circuitry such as, but not limited to, one or more single-core or multi-core processors. The processors may include a baseband processor. The baseband circuitry may handle various radio control functions that enables communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry.

In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency. The RF circuitry 710 may enable communication with wireless networks using modulated electromagnetic radiation through a non-solid medium. In various embodiments, the RF circuitry may include switches, filters, amplifiers, etc. to facilitate the communication with the wireless network. In various embodiments, the RF circuitry 710 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the AP or STA may be embodied in whole or in part in one or more of the RF circuitry, the baseband circuitry, and/or the application circuitry. As used herein, "circuitry" may refer to, be part of, or include an Application Specific Integrated Circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules. In some embodiments, some or all of the constituent components of the baseband circuitry, the application circuitry, and/or the memory/storage may be implemented together on a system on a chip (SOC). The memory/storage 740 may be used to load and store data and/or instructions, for example, for system. The memory/storage for one embodiment may include any combination of suitable volatile memory, such as dynamic random access memory (DRAM)), and/or non-volatile memory, such as flash memory.

In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface. In various embodiments, the sensor 770 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various embodiments, the display 750 may include a display, such as a liquid crystal display and a touch screen display. In various embodiments, the system 700 may be a mobile computing device such as, but not limited to, a laptop computing device, a tablet computing device, a netbook, an ultrabook, a smartphone, an AR/VR glasses, etc. In various embodiments, system may have more or less components, and/or different architectures. Where appropriate, methods described herein may be implemented as a computer program. The computer program may be stored on a storage medium, such as a non-transitory storage medium.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of application and design requirement for a technical plan. A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms. The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. A wireless communication method, comprising:

transmitting, by an access point (AP), a physical layer protocol data unit (PPDU) which carries two or more aggregate medium access control (MAC) protocol data units (A-MPDUs), wherein at least one of the two or more A-MPDU comprises one or more triggered response scheduling (TRS) Control subfields for configuring any of one or more high efficiency (HE) trigger-based (TB) PPDUs and one or more extremely high efficiency (EHT) TB PPDUs, wherein each TRS Control subfield comprises an uplink modulation and coding scheme (UL MCS) subfield for indicating modulation and coding schemes used in a TB PPDU response, wherein when the TRS Control subfield is carried in an HE multi-user (MU) PPDU, the UL MCS subfield indicates HE-MCS, in a range HE-MCS 0 to 3, and the UL MCS subfield is set to HE-MCS index, when the TRS Control subfield is carried in an EHT MU PPDU, the UL MCS subfield indicates EHT-SIG-MCS, in a range EHT-SIG-MCS 0 to 3, and the UL MCS subfield is set to EHT-SIG-MCS index, and wherein the EHT-SIG-MCS is set to 0 for EHT-MCS 0, the EHT-SIG-MCS is set to 1 for EHT-MCS 1, the EHT-SIG-MCS is set to 2 for EHT-MCS 3, and the EHT-SIG-MCS is set to 3 for EHT-MCS 15.

2. The wireless communication method of claim 1, wherein the EHT-SIG-MCS is a compact representation of a modulation and coding scheme used in the EHT-SIG field of the EHT MU PPDU.

3. The wireless communication method of claim 1, wherein when the TRS Control subfield is carried in an EHT MU PPDU, an RU Allocation subfield together with a PS160 bit indicates RU or MRU allocation.

4. The wireless communication method of claim 3, wherein a value of the PS160 bit is determined according to a location of RU or MRU carrying TRS Control subfield in EHT MU PPDU.

5. The wireless communication method of claim 4, wherein when the RU or MRU containing the TRS Control subfield in the EHT MU PPDU is within primary 160 MHz, the PS160 bit is set to 0, otherwise the PS160 bit is set to 1.

6. The wireless communication method of claim 1, wherein a Control Information field in a TRS Control subfield comprises at least one of following:

a subfield indicating UL Data Symbols, a subfield indicating RU Allocation, a subfield indicating AP Tx Power, a subfield indicating UL Target Receive Power, a subfield indicating UL MCS, or a Reserved subfield.

7. An access point (AP), comprising a memory; a transceiver; and a processor coupled to the memory and the transceiver, wherein the processor is configured to perform a wireless communication method comprising:

transmitting a physical layer protocol data unit (PPDU) which carries two or more aggregate medium access control (MAC) protocol data units (A-MPDUs), wherein at least one of the two or more A-MPDU comprises one or more triggered response scheduling (TRS) Control subfields for configuring any of one or more high efficiency (HE) trigger-based (TB) PPDUs and one or more extremely high efficiency (EHT) TB PPDUs, wherein each TRS Control subfield comprises an uplink modulation and coding scheme (UL MCS) subfield for indicating modulation and coding schemes used in a TB PPDU response, wherein when the TRS Control subfield is carried in an HE multi-user (MU) PPDU, the UL MCS subfield indicates HE-MCS, in a range HE-MCS 0 to 3, and the UL MCS subfield is set to HE-MCS index, when the TRS Control subfield is in carried an EHT MU PPDU, the UL MCS subfield indicates EHT-SIG-MCS, in a range EHT-SIG-MCS 0 to 3, and the UL MCS subfield is set to EHT-SIG-MCS index, and wherein the EHT-SIG-MCS is set to 0 for EHT-MCS 0, the EHT-SIG-MCS is set to 1 for EHT-MCS 1, the EHT-SIG-MCS is set to 2 for EHT-MCS 3, and the EHT-SIG-MCS is set to 3 for EHT-MCS 15.

8. The AP of claim 7, wherein the EHT-SIG-MCS is a compact representation of a modulation and coding scheme used in the EHT-SIG field of the EHT MU PPDU.

9. The AP of claim 7, wherein when the TRS Control subfield is carried in an EHT MU PPDU, an RU Allocation subfield together with a PS160 bit indicates RU or MRU allocation.

10. The AP of claim 9, wherein a value of the PS160 bit is determined according to a location of RU or MRU carrying TRS Control subfield in EHT MU PPDU.

11. The AP of claim 10, wherein when the RU or MRU containing the TRS Control subfield in the EHT MU PPDU is within primary 160 MHz, the PS160 bit is set to 0, otherwise the PS160 bit is set to 1.

12. The AP of claim 7, wherein a Control Information field in a TRS Control subfield comprises at least one of following:

a subfield indicating UL Data Symbols, a subfield indicating RU Allocation, a subfield indicating AP Tx Power, a subfield indicating UL Target Receive Power, a subfield indicating UL MCS, or a Reserved subfield.

13. A wireless communication method, comprising:

receiving, by an extremely high throughput (EHT) station (STA), a triggered response scheduling (TRS) Control subfield carried in an EHT multi-user (MU) physical layer protocol data unit (PPDU), wherein the TRS Control subfield comprises an uplink modulation and coding scheme (UL MCS) subfield for indicating modulation and coding schemes used in a trigger-based (TB) PPDU response, wherein the UL MCS subfield indicates EHT-SIG-MCS, in a range EHT-SIG-MCS 0 to 3, and the UL MCS subfield is set to EHT-SIG-MCS index, and wherein the EHT-SIG-MCS is set to 0 for EHT-MCS 0, the EHT-SIG-MCS is set to 1 for EHT-MCS 1, the EHT-SIG-MCS is set to 2 for EHT-MCS 3, and the EHT-SIG-MCS is set to 3 for EHT-MCS 15.

14. The wireless communication method of claim 13, wherein the EHT-SIG-MCS is a compact representation of a modulation and coding scheme used in the EHT-SIG field of the EHT MU PPDU.

15. The wireless communication method of claim 13, wherein when the TRS Control subfield is carried in an EHT MU PPDU, an RU Allocation subfield together with a PS160 bit indicates RU or MRU allocation.

16. The wireless communication method of claim 15, wherein a value of the PS160 bit is determined according to a location of RU or MRU carrying TRS Control subfield in EHT MU PPDU.

17. A station (STA), comprising a memory; a transceiver; and a processor coupled to the memory and the transceiver, wherein the processor is configured to perform a wireless communication method comprising:

receiving a triggered response scheduling (TRS) Control subfield carried in an extremely high throughput (EHT) multi-user (MU) physical layer protocol data unit (PPDU), wherein the TRS Control subfield comprises an uplink modulation and coding scheme (UL MCS) subfield for indicating modulation and coding schemes used in a trigger-based (TB) PPDU response, wherein the UL MCS subfield indicates EHT-SIG-MCS, in a range EHT-SIG-MCS 0 to 3, and the UL MCS subfield is set to EHT-SIG-MCS index, and wherein the EHT-SIG-MCS is set to 0 for EHT-MCS 0, the EHT-SIG-MCS is set to 1 for EHT-MCS 1, the EHT-SIG-MCS is set to 2 for EHT-MCS 3, and the EHT-SIG-MCS is set to 3 for EHT-MCS 15.

18. The STA of claim 17, wherein the EHT-SIG-MCS is a compact representation of a modulation and coding scheme used in the EHT-SIG field of the EHT MU PPDU.

19. The STA of claim 17, wherein when the TRS Control subfield is carried in an EHT MU PPDU, an RU Allocation subfield together with a PS160 bit indicates RU or MRU allocation.

20. The STA of claim 19, wherein a value of the PS160 bit is determined according to a location of RU or MRU carrying TRS Control subfield in EHT MU PPDU.

* * * * *